Patented May 2, 1939

2,156,903

UNITED STATES PATENT OFFICE 2,156,903

MANUFACTURE OF GEL-TYPE METALLIC OXIDE CATALYSTS

Robert F. Ruthruff, Nutley, N. J., assignor to Process Management Company, Inc., New York, N. Y., a corporation of Delaware No Drawing. Application December 22, 1937, Serial No. 181,060

7 Claims. (Cl. 23—233)

This invention relates to the preparation of catalytic materials and more particularly to the preparation of catalysts of the so-called oxide gel type from metal salts having the ability to peptize the oxide, hydroxide or hydrous oxide of the metal. Still more particularly, the invention relates to the production of chromium oxide catalysts of high catalytic activity.

In the preparation of a metallic oxide catalyst such as the oxides of iron, aluminum and chromium by the method which includes the precipitation of the corresponding hydroxide as a gelatinous mass it is common practice to carry out the precipitation in dilute solution with slow addition of the reagent because metallic hydroxide precipitants formed in concentrated solution adsorb salts so strongly that it is practically impossible to remove them by subsequent washing and because rapid precipitation of the hydroxide in a dilute solution results in the formation of a non-gelatinous precipitate which is unsuitable for the preparation of an active catalyst. For example, in preparing chromium oxide catalysts of this type it is customary to precipitate the hydroxide from a dilute solution of a salt of chromium, for example, 0.1 normal chromium nitrate solution, by the slow addition of slightly more than the theoretical amount of dilute ammonium hydroxide, for example, 0.1 normal ammonia solution. When about half of the required amount of hydroxide reagent has been added the solution is stirred for several hours, before introducing the remainder, for the purpose of conditioning the solution.

It is an object of the present invention to provide a method whereby metallic oxide catalysts may be prepared by the precipitation of the corresponding hydroxide as a gelatinous mass in a dilute solution with substantially less expenditure of time and energy than in the prior practice, as outlined above.

In the following description and claims the gelatinous precipitate which is dried to produce the desired catalyst is designated as the metallic hydroxide reaction product. However, it is to be understood that the invention is not limited by the use of the expression "hydroxide" in this connection. In many cases the exact nature of the precipitate formed is not known, but it appears that the precipitates obtained from different metals differ in composition, some of them being the oxide itself, others the oxide with a definite amount of water of composition, that is, the hydroxide, while others are oxides holding a large but indefinite amount of water, that is, hydrous oxides. It is to be understood, therefore, that the expression "hydroxide reaction product" refers to all such gelatinous precipitates as are obtained by the method of the present invention regardless of their exact composition as oxides, hydroxides, or hydrous oxides.

In the present invention the reaction of the metallic salt and the hydroxide reagent is carried out in a concentrated solution until the amount of unreacted metallic salt remaining is insufficient to peptize the hydroxide reaction product, and thereafter precipitation of the hydroxide as a gelatinous mass is effected in a dilute solution. The precipitation is brought about by the addition to the solution of a weak base which is not substantially ionized in the said solution under the conditions maintained. The weak base is added in an amount at least equivalent to the excess acid of the solution, and the resulting solution is then heated to increase the ionization of the weak base and effect precipitation of the hydroxide reaction product as a gelatinous mass.

In accordance with this method aqueous solutions of the metallic salt and a hydroxide reagent capable of substantial ionization in the resulting solution are mixed by the rapid progressive addition of the latter to the former. The concentrations of these solutions are regulated to produce a resulting solution wherein the concentration of the unreacted metallic salt is sufficient to effect rapid peptization of the metallic hydroxide reaction product until substantially all of the metallic salt has been converted to the said reaction product. The progressive addition of the hydroxide reagent to this solution under these conditions is continued until the unreacted metallic salt is insufficient to peptize additional hydroxide reaction product and thus is no longer able to peptize the hydroxide reaction product formed, and any further addition of the reagent will cause precipitation. Thereafter the concentration of the colloidal metallic hydroxide solution is regulated whereby on subsequent precipitation of the said hydroxide reaction product as a gelatinous mass the concentration of soluble salts therein is insufficient to effect substantial adsorption by the said precipitate. In the first stage in which the solution is relatively concentrated the addition of the reagent may be effected relatively rapidly with stirring. In the second stage the addition of the weakly ionized base is carried out rapidly, and thereafter the solution is heated to bring about the desired precipitation.

The regulation of the concentration of the hydroxide reagent and the salt solution in the first stage of the process may be effected by employing one or both as concentrated solutions. Preferably both are concentrated since this hastens the process by permitting more rapid addition due to the fact that the concentration of the unreacted salt is sufficient to effect rapid peptization of the metallic hydroxide reaction product. The exact concentration of the reagents employed will depend upon convenience and the nature of the reagents, but it will be apparent that it is advantageous to employ relatively concentrated solutions of each since in this manner the advantages of the invention are realized to the fullest degree.

The regulation of the concentration of the solution in the second stage may be effected by diluting the colloidal metallic hydroxide solution or by diluting the weakly ionized base which is being added thereto or both. Here again the convenience and the nature of the reagents employed may vary somewhat the degree of dilution employed. Addition of the weakly ionized base may be effected before, after, or during any desired dilution of the colloidal metallic hydroxide solution. However since it is desired to obtain precipitates which are relatively free from adsorbed salts it is necessary to effect the necessary dilution before the solution is heated to the extent necessary to effect precipitation whereby the precipitate is brought down in relatively dilute solution.

The weakly ionized base employed in the second, or dilute, stage of the process may be any which is not substantially ionized in the solution under treatment under the conditions existing there and which becomes more ionized on heating to alkalize the solution and effect precipitation. Any base of the desired characteristics will do but it will be found that a number of weakly ionized organic bases are suitable, for example, phenylhydrazine, pyridine, phenylenediamine, aniline, creatinine, naphthylamine, quinoline, and toluidine. For treatment of the dilute solution at atmospheric pressure weakly ionized bases having ionization constants at room temperature in the range of approximately $1 \times 10^{-10}$ to approximately $3 \times 10^{-9}$ are suitable. Bases more weakly ionized than those in that range may also be employed but it may be necessary to employ super-atmospheric pressure in heating the dilute solution when employing extremely weak bases.

In its preferred form the invention employs in the first stage a relatively concentrated solution of a salt of the metal of the oxide catalyst desired and a concentrated solution of the hydroxide reagent capable of substantial ionization, for example, a normal solution of the salt and a concentrated hydroxide solution such as ammonium hydroxide, potassium hydroxide, or sodium hydroxide. To effect the precipitation of the hydroxides of chromium, aluminum, and iron in accordance with the invention it is preferred to employ ammonium hydroxide as the reagent while in the precipitation of hydroxides of copper, cobalt, and nickel it is preferred to employ sodium hydroxide as the reagent. The concentrated hydroxide solution is added to the metallic salt solution rapidly with stirring to the maximum amount possible without forming a permanent precipitate. Thereafter the colloidal hydroxide solution is diluted substantially with water, e. g. to a concentration of 0.1 to 0.2 normal, and the weakly ionized base is added rapidly with stirring. Then the solution is heated to effect precipitation of the metallic hydroxide as a gelatinous mass. Because of the relative insolubility of most of the weak bases available it is advisable to continue rapid stirring to insure intimate mixing during the heating of the mixture. The amount of the hydroxide reagent which may be added in the concentrated form will vary in accordance with the nature of the salt and the precipitant employed. For example, over 70% of the theoretical amount of ammonia may be added rapidly in the concentrated form when chromium nitrate solutions are employed, while with concentrated solutions of ferric chloride 90% of the theoretical amount of ammonia may be added rapidly in the concentrated form without forming a permanent precipitate.

Example I 160 grams of chromium nitrate .9 $H_2O$ are dissolved in 1200 cc. of water. Concentrated ammonia is added drop by drop with stirring until a permanent precipitate just forms. The solution is then heated to 150° F., and ammonia is again added until a mere trace of permanent precipitate remains after a vigorous stirring for a minute or two. 50–55 cc. of concentrated ammonia (28%) are added in this manner. The warm solution is then added to 4800 cc. of water. 65 cc. of phenyl hydrazine are added following which the mixture is brought to a boil and boiled vigorously for 5 minutes following which it is kept hot for 30 minutes. At the end of this period all chromium should be precipitated. If not an additional 65 cc. of phenyl hydrazine is added and the solution is boiled vigorously for 5 minutes and kept hot for 30 minutes. If all of the chromium is not precipitated by this procedure it indicates that insufficient concentrated ammonia has been employed. It is advantageous that the maximum possible amount of concentrated ammonia be added to the warm solution without causing more than a trace of permanent precipitate to form. If this is accomplished all the chromium may be precipitated rapidly and completely with the minimum amount of phenylhydrazine. The precipitated chromium hydroxide is allowed to settle and is washed with water by decantation or by some other suitable means. The first two or three washings should be done as rapidly as possible to prevent the formation of undesirable oxidation products by the excess phenylhydrazine. The washed precipitate is filtered and dried at 100° C. to form the shining black chromium oxide gel.

Example II 110 grams of ferric chloride .6 $H_2O$ are dissolved in 1200 cc. of water. Concentrated ammonia is added drop by drop with stirring until a permanent precipitate just forms. The solution is then heated to about 150° F., and ammonia is then added until a mere trace of precipitate remains after a vigorous stirring for a minute or two. In this manner 65–70 cc. of concentrated ammonia (28%) are introduced into the solution. The warm solution is now added to 4800 cc. of water. 65 cc. of phenylhydrazine are then added following which the precipitation of the ferric hydroxide as a gelatinous mass and the washing and drying thereof are effected in the manner described above in connection with Example I.

The above examples relating to the formation of chromium oxide and ferric oxide catalysts by the method of the present invention illustrate the application of the invention to the production of these catalysts. It is to be understood, however, that the invention is not limited by such specific illustration but is applicable to the production of other metallic oxide catalysts of this type with such slight modifications as would occur to those skilled in the art.

I claim:

1. In the preparation of catalysts of the metallic oxide gel type by reaction of a metallic salt and a hydroxide reagent in aqueous solution to precipitate the hydroxide of the metal as a gelatinous mass, the steps comprising mixing with an aqueous solution of the metallic salt an aqueous solution of an hydroxide capable of substantial ionization in the resulting solution by progressive addition of the latter to the metallic salt solution, regulating the concentrations of said solutions to produce a resulting solution in which the concentration of unreacted metallic salt is sufficient to effect rapid peptization of the metallic hydroxide product, continuing the said addition rapidly with agitation of the resulting solution until the unreacted metallic salt present in the resulting solution is insufficient to peptize additional hydroxide reaction product, discontinuing addition of said hydroxide to the resulting solution, adding to said resulting solution in an amount at least equivalent to the excess acid thereof a base which is not substantially ionized in said solution, heating the resulting solution to increase the ionization therein of said last added base and effect precipitation of said metallic hydroxide product as a gelatinous mass, regulating the concentration of said solution prior to said preciptiation therein whereby the concentration of soluble salts in said solution is insufficient to effect their substantial adsorption by said precipitate thus obtained from said solution, and drying said separated precipitate to produce therefrom a vitreous metallic oxide catalyst.

2. The method in accordance with claim 1 wherein a chromium salt is reacted as described to effect precipitation of a gelatinous chromium hydroxide product.

3. The method in accordance with claim 1 wherein ammonium hydroxide is employed as the said hydroxide capable of substantial ionization in the said resulting solution.

4. The method in acordance with claim 1 wherein phenylhydrazine is employed as the base which is not substantially ionized in the said solution.

5. The method in accordance with claim 1 wherein pyridine is employed as the base which is not substantially ionized in the said solution.

6. The method in accordance with claim 1 wherein phenylenediamine is employed as the base which is not substantially ionized in the said solution.

7. The method for preparing a chromium oxide gel type of catalyst which comprises mixing a relatively concentrated aqueous chromium nitrate solution and concentrated ammonium hydroxide by progressive addition of the latter to the chromium nitrate solution, continuing the said addition rapidly with agitaton of the resulting solution until the unreacted chromium nitrate is insufficient to peptize additional chromium hydroxide reaction product, discontinuing addition of said ammonium hydroxide to the resulting solution, adding phenylhydrazine to said resulting solution in an amount at least equivalent to the excess acid thereof, heating the resulting solution to increase the ionization of said phenylhydrazine in said solution and effect precipitation of the said chromium hydroxide reaction product as a gelatinous mass, regulating the concentration of the said solution prior to said precipitation whereby the concentration of soluble salts in said solution is insufficient to effect their substantial adsorption by said precipitate, separating the precipitate thus obtained from said solution, and drying said separated precipitate to produce a vitreous chromium oxide catalyst.

ROBERT F. RUTHRUFF.